United States Patent Office 3,449,384
Patented June 10, 1969

3,449,384
ISOMERIZATION OF CERTAIN POLYENES EMPLOYING A METAL CATALYST AND A HYDROSILICON COMPOUND
Hans H. Ender, Buffalo, N.Y., assignor to Union Carbide Corporation, a corporation of New York
No Drawing. Filed June 22, 1964, Ser. No. 377,134
Int. Cl. C11c 3/14; C09f 7/00; C07f 7/02
U.S. Cl. 260—405.6                                     8 Claims

ABSTRACT OF THE DISCLOSURE

Non-conjugated carbon-to-carbon double bonds in polyenes are isomerized to conjugated double bonds by mixing the non-conjugated polyene with a hydrosilicon compound, such as siloxanes, and a metal catalyst, and heating the mixture until the desired degree of conjugation is obtained.

---

This invention relates to the isomerization of polyenes. More specifically, it relates to a process for the conjugation of non-conjugated olefinic carbon-to-carbon double bonds in polyenes and to the products obtained thereby. This process is particularly useful for upgrading drying oils.

Conjugation, as that term is used throughout this disclosure, is intended to mean the shifting of carbon-to-carbon double bonds to a position such that in a carbon chain the sequence of carbon-to-carbon bonds becomes double-single-double. An illustration of the general reaction is as follows:

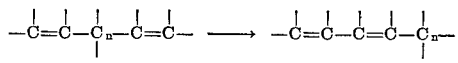

where $n$ is any whole number from 1 to about 6 inclusive; preferably $n$ is 1. Wherever the term "double bonds" is used throughout this disclosure, olefinically unsaturated carbon-to-carbon bonds are intended.

Several processes have in the past been suggested for isomerization of drying and semi-drying oils with the objective of producing a substitute for tung oil, or for the purpose of improving the drying properties of semi-drying oils in order to provide a substitute for linseed oil. The known methods of conjugation have included alkali isomerization; isomerization with sulfur dioxide, with iodine compounds, with nickel catalysts, with nickel-selenium catalysts, with nickel-tellurium catalysts, as well as isomerization treatment with tertiary butyl hypochlorite followed by dehydrochlorination. All of the above processes suffer from certain disadvantages. In some cases the dried isomerized-oil films remain indefinitely tacky, in other cases the high temperatures required for isomerization cause excessive polymerization of the oil. Still other methods, such as the alkali isomerization and hypochlorite methods are disadvantageous since they involve several chemical reactions. Despite these difficulties, conjugation of isolated olefinic double bonds is desirable in many areas of chemical technology, since it causes changes in the structure of a compound, and consequently in its properties. It is of particular interest in the field of drying oils for reasons which will be described hereafter.

Although the mechanism and theory of oxygenation and drying of oil films are still the object of much study and controversy, certain observable facts are undisputable. For example, only oils having a significant percentage of unsaturated fatty acids and containing a plurality of double bonds dry within a practically reasonable length of time. Drying is promoted by light, especially ultraviolet light, by high temperature, by infrared radiation and by metal catalysts such as cobalt, manganese and lead. Solutions of salts of these metals commonly called "dryers," have been used in drying oils for centuries. The most common salts are the oil-soluble salts of fatty acids, abietic acid, napthenic acid and octoic (2-ethylhexoic) acid. Drying is ordinarily accompanied first by an increase in the weight of the coating or film due to the absorption of oxygen, and later by a loss in weight due to formation of volatile decomposition products. The rate of the decomposition is promoted by the absorbed oxygen and also by the same catalysts which were used to promote the drying process.

Drying oils having conjugated double bonds are highly desirable. It is known that oils having conjugated double bonds of the trans-type structure are the most reactive. They add oxygen easily, polymerize by free radical mechanism, and permit the formation of specially cross-linked structures. It is believed that oxidative drying of non-conjugated oils begins by transformation of the double bonds from the naturally predominant cis-type structure to the trans-type structure and by shifting of the double bonds to a conjugated position. This naturally occurring process is very low and characterized by a relatively long induction period. Conjugated oils dry after the absorption of much smaller quantities of oxygen than non-conjugated oils. Absorption of smaller quantities of oxygen is very desirable, since absorbed oxygen is responsible for the subsequent deterioration of the oil film. Consequently, conjugated drying oils have considerable advantages over non-conjugated oils in that they not only dry faster, but are also less subject to premature destruction by over-oxidation.

It has been the objective of oil chemists for some time to achieve limited oxidation, cis-trans isomerization, conjugation of the double bonds, and partial polymerization of drying oils prior to the time they are to be used for coating and other compositions. Some of these objectives have been achieved by air blowing, or heat bodying at about 300° C. in the absence of air. In both cases, geometrical (cis-trans) and positional (conjugational) isomerization occur, but only to a very limited extent. No more than about 2–3% of the bonds become conjugated either by air blowing or heat bodying. Furthermore, these methods are disadvantageous in that the most reactive, triply conjugated double bonds immediately react further causing the formation of cyclic and partially cross-linked polymers of high viscosity. These often contain gel particles which are extremely difficult to remove.

Conjugation of double bonds in drying oils is evidenced by changes in the physical properties of the oil as well as its drying characteristics. For example, conjugation results in an increase in the density, refractive index, viscosity, diene number, pandiene number,[1] infrared and ultraviolet absorption. In the preparation of drying oils from non-conjugated polyenes an increase in refractive index of about 0.0080 to 0.0120 is preferred. Substantial isomerization of linseed oil is indicated by a change in refractive index of from 1,4795 to 1.4910. Such a change would indicate an increase from about 4% conjugation to about 45% conjugation.

Ultraviolet (U.V.) absorption permits quantitative measurement of the conjugation present in a molecule. Non-conjugated or isolated double bonds do not absorb in the region between 200 and 400 m$\mu$, thus absorptivity at these wave lengths is zero. Conjugated dienes, trienes and tetraenes, however show characteristic absorptions at about 233 m$\mu$, 273 m$\mu$, and 317 m$\mu$ respectively. The absorptivity at these wave lengths may be correlated by

---

[1] For methods of calculation see: Mikusch, Farbe and Lack 60, 178 (1954).

well known techniques to the percentage of double bonds which are conjugated.[2]

It is an object of this invention to isomerize polyenes.

It is another object of this invention to shift at least 10% of the non-conjugated double bonds of polyenes to a conjugated position.

It is another object of this invention to cause rearrangement of at least a portion of those double bonds having a cis structure to bonds having a trans structure.

It is another object of this invention to improve or upgrade the properties of drying oils having a plurality of non-conjugated double bonds by conjugating at least 10% of said double bonds.

It is another object of this invention to improve the properties of drying oils by simultaneously effecting conjugation of their double bonds and rearrangement of those bonds having a cis structure to bonds with a trans structure.

These and other objects may be achieved by a process which comprises mixing a non-conjugated polyene with a hydrosilicon compound (also conveniently referred to as an SiH compound) and a metal catalyst, and then heating the mixture until the desired degree of conjugation is obtained. A hydrosilicon compound is defined as a compound containing at least one silanic hydrogen bond, i.e. a hydrogen atom bonded directly to a silicon atom

Such compounds include both hydrosilanes and hydrosiloxanes.

In part, this invention consists in the discovery that when a hydrosilicon compound is caused to add across a small percentage (in the order of 1%) of the double bonds in a system containing molecules with a plurality of non-conjugated double bonds, a substantial number of the unreacted double bonds will be shifted to the conjugated position. This shift is most unexpected, since conjugation is induced not only in those molecules in which SiH addition has taken place, but also in other molecules in the reaction system. Thus, it has been found that if a hydrosilicon compound plus a conventional metallic SiH addition catalyst (i.e. a catalyst which promotes the addition of SiH across a double bond) is added to a polyene in an amount which will result in having one SiH group per 85 double bonds present in the reaction system, 10% of the double bonds which have not reacted with the SiH compound by addition will become conjugated. By increasing the ratio of SiH groups to double bonds to 1:5, up to 85% of the double bonds which have not reacted with the SiH compound will be conjugated. This means that while no more than ⅕ of the double bonds in the system may add SiH, up to 68% of the double bonds originally present may become conjugated.

It has also been found that free SiH compounds usually remain in the system even after the conjugation reaction is completed. This indicates that despite the considerable excess of double bonds over SiH groups in the reaction system, the addition reaction is subordinated to the conjugation reaction. In other words, conjugation and not addition is the predominant reaction taking place. The conjugation reaction takes place only in the presence of both the hydrosilicon compound and the metal catalyst, the presence of either of these materials alone fails to cause conjugation of polyenes. It is hypothesized that the real catalytic agent is the metal catalyst which has in some way been activated by the presence of the hydrosilicon compound.

While the invention will be described and exemplified primarily as it affects drying oils, it is not limited to such materials, since it will be readily apparent to those skilled in the art that the reaction has general applicability; that is, the same process and principles are applicable to the isomerization of substantially any compound containing a plurality of carbon-to-carbon double bonds. This is so because the isomerization mechanism does not depend upon the presence of ester groups in the drying oils, but depends rather upon the unexpected effect produced by the presence of a metal catalyst and an SiH compound upon non-conjugated double bonds in polyenes, when used in certain proportions and reacted within a certain range of temperature, irrespective of other functional groups which may be present in the polyene molecules.

The drying oils produced by the methods of this invention differ from all isomerized drying oils made by prior art methods, since according to the present invention SiH addition takes place during the isomerization reaction. Consequently, the isomerized polyenes of this invention are characterized by having a silicon content of about 0.2 to 15% based on the weight of the isomerized polyene; preferably about 1%. The oils made by the methods of the present invention also contain some unreacted SiH groups. The amount thereof may be determined quantitatively by measuring the volume of hydrogen gas evolved per gram of oil in the presence of alkali or by measuring the characteristic SiH absorption in the infrared spectrum at 4.64 m$\mu$ wave lengths. The polyenes made by the methods of this invention ordinarily contain about 0.1 to 20 ml./gm. of hydrogen.

It has also been found that the conjugated drying oils prepared according to this invention dry in about one-tenth of the time required for drying the same oil prior to conjugation. The best commercially available isomerized linseed oils have a drying time (in the presence of driers) of about 30 to 60 minutes, generally about 45 minutes, whereas the average drying time of isomerized linseed oil prepared according to the methods of this invention is about 15 to 20 minutes, the fastest being about 8 minutes. Furthermore, the conjugated oils dry after absorbing only about half the quantity of oxygen as compared to the same oil prior to conjugation. A further advantage of this invention is that if heavy bodied (i.e. high viscosity) oils are desired, the conjugated oils can easily be polymerized at a relatively low temperature (about 240° C.), and in a shorter time than required for untreated (i.e. unconjugated) oils which require a bodying temperature of from 280 to 300° C. The use of the lower bodying temperature prevents decomposition and formation of volatile products. At the higher bodying temperatures required by the untreated oil, losses of up to 8% are not uncommon. The conjugated oils are clearer in color by one or two numbers on the Gardener-Hellige Scale than untreated oils and upon exposure to light may be bleached to colorless liquids.

This invention is particularly adapted to the improvement of natural and synthetic drying oils. Drying oils are mixtures of various triglycerides of saturated and unsaturated fatty acids in which unsaturated esters with a plurality of double bonds prevail. Three types of oils are ordinarily distinguished: non-drying, semi-drying and drying oils. Non-drying oils include olive, castor and rapeseed oils. Semi-drying oils include cottonseed, soybean, sunflower, safflower and walnut oil. Linseed, perilla, dehydrated castor, oiticica and tung oil are classified as drying oils. The oils need not be natural oils or glycerol esters in order that they be isomerizable by the methods of this invention. They may be the esters of any monohydric or polyhydric alcohol, as for example, ethylene glycol, polyethylene glycol, propylene glycol, polypropylene glycol, pentaerythritol, sorbitol or mixtures of these.

As an illustration of this invention, linoleic acid glycerides which have two isolated double bonds in the fatty acid chain can be converted to 9,11-octadeca-

---

[2] For further reference see: Mattiello, "Protective and Decorative Coatings," Vol. V, p. 144, John Wiley & Sons, New York (1946). See also Jaffey and Orchin, "Theory and Application of Ultra Violet Spectroscopy," John Wiley & Sons, New York (1962); Bellamy, "Infrared Spectroscopy of Complex Molecules," John Wiley & Sons, New York (1958).

dienoic acid esters and into other isomers with the conjugated double bond systems in other position, for example the 10, 12 or 11, 13 positions. As another illustration, linolenic acid glycerides (which has three isolated double bonds in the fatty acid chain) can be converted partially into glycerides with three conjugated double bonds, and partially into glycerides with two conjugated and one isolated double bond. Thus, linolenic acid esters usually form two types of products, labeled A and B, where A is: the 9, 11, 13; the 10, 12, 14; or the 11, 13, 15 ester, or mixtures thereof, and where B is: the 9, 11, 15; the 9, 13, 15 esters or mixtures thereof.

The first group, A, contains three conjugated double bonds, e.g. elaeostearic acid (9, 11, 13-octadecatrienoic acid) which occurs in tung oil. The second group, B, has two conjugated and one isolated double bond. The ratio of A to B is ordinarily 1:1 but may be varied within wide limits depending upon reaction conditions.

Along with the above described positional isomerization, geometrical isomerization usually takes place also. The latter transforms a substantial portion of the cis type of structural isomers found in naturally occurring oils into the trans type of isomeric structure.

Substantially any polyene compound, that is, any compound either monomeric or polymeric which contains two or more non-conjugated olefinic carbon-to-carbon double bonds in its carbon chain may be isomerized by the methods of this invention. Preferably the polyene has 2 to 3 isolated double bonds. Such polyenes may be straight chained, branched or cyclic. The double bonds may be separated by from one carbon atom in the carbon chain up to about 6 carbon atoms. As the distance between the isolated double bonds is increased, the likelihood of inducing conjugation is decreased. No observable conjugation has been induced in polyenes where the double bonds were separated by more than 6 carbon atoms in the chain. The double bonds to be isomerized may be situated in ring compounds as well as in acyclic compounds and need not be located in the same ring. They may be located in different rings of a condensed non-aromatic ring system (as, for example, in steroids and isoprenoids). Conjugation may also be induced in compounds where one double bond is located in a non-aromatic ring and the other in a side chain (as in vinyl cyclohexene which isomerizes to ethyl cyclohexadiene).

Polyenes which may be isomerized by this invention are not limited to hydrocarbon compounds. Any functional group, but preferably one that does not react vigorously with the hydrosilicon compound, may be attached to the carbon chain of the polyene. Functional groups which may be present include, for example, hydroxyl, carboxyl, amine, ether, ester, acetal, amide, epoxide and halogen groups. Polyenes which contain functional substituents containing no active hydrogen atoms, however, are preferred; these include ethers, esters, acetals, tertiary amines, dialkyl amides, epoxides and aromatically-bonded halogen groups. Polyenes with functional groups containing active hydrogen atoms can be isomerized either by use of an excess amount of hydrosilicon compound beyond that which will react with the active hydrogen, or by blocking the active hydrogen atoms to prevent their reaction with the SiH group. If the latter method is employed, after isomerization has taken place the blocked group can be reconverted to the original functional group. Blocking can be accomplished, for example, by esterfying an acid, by etherifying an alcohol, by alkylating primary and secondary amines to tertiary amines, by dialkylating amides, and by converting aldehydes or ketones to acetals. Consequently, substantially any compound containing a plurality of olefinic double bonds may be isomerized by the process of this invention.

Illustrative of non-conjugated functionally substituted polyenes are fatty acid esters such as glycerol linoleate, linoleic acid, amides, epoxides, abietic acid glycerol esters, steroids containing keto and/or OH groups, terpene alcohols, terpene ketones, etc.

Illustrative of non-conjugated polyenes containing three non-conjugated double bonds in the carbon chain are linolenic acid esters such as found in perilla, stillingia, chia, canophor and lallemantia oils. Illustrative of polyenes containing more than three non-conjugated double bonds in the carbon chain are arachidonic acid, $C_{20}H_{32}O_2$ containing four double bonds; clupanodonic acid, $C_{22}H_{24}O_2$ containing five double bonds, and nicinic acid, $C_{24}H_{26}O_2$ containing six double bonds. It is to be understood that functional derivatives other than the acids or esters such as described before can also be isomerized by the process of this invention.

Among polymers containing a plurality of non-conjugated double bonds to which this invention is applicable are non-crosslinked, low molecular weight polyisoprene, polybutadiene, polycyclopentadiene, natural rubber, polychloroprene and copolymers thereof. Since the conjugation catalysts also promote polymerization, high molecular weight or crosslinked materials have a tendency to gel before appreciable isomerization has taken place. Consequently, only non-crosslinked polymers of relatively low molecular weight have been found suitable. Polymerization inhibitors such as hydroquinone can be used to increase isomerization by decreasing the rate of polymerization and resultant gelation.

The hydrosilicon compounds that are suitable for use in the present invention must contain at least one silanic hydrogen bond. Such compounds include both hydrosilanes and hydrosiloxanes; they may be monomeric or polymeric; linear, branched or cyclic in structure; and may contain from one silicon bonded hydrogen atom to any greater number of silicon bonded hydrogen atoms per molecule. In addition, any one silicon atom may contain from 1 to 4 hydrogen atoms bonded directly to it. The remaining valence bonds of the silicon atom, that is, those not bonded either to hydrogen or oxygen atoms may be satisfied with substituted or unsubstituted, saturated or olefinically unsaturated, aliphatic or aromatic hydrocarbons, or with functional groups; preferably such functional groups are free of active hydrogen atoms. Groups containing no active hydrogen atoms include ethers, esters, epoxides, halogens, nitriles and dialkyl amides. These functionay groups may be bonded either directly to the silicon atom or be substituted on the above-mentioned hydrocarbon groups. Saturated hydrocarbons are preferred.

The hydrosilanes that are useful in the present invention are represented by the formula:

(A)    $R_xSiH_{4-x}$ where R is selected from the group consisting of (a) an unsubstituted hydrocarbon group, (b) a functionally substituted hydrocarbon group wherein the functional group is a non-active hydrogen atom containing functional group, and (c) a non-active hydrogen atom containing functional group; and where x represents any whole number from 0 to 3 inclusive. The hydrocarbon groups (substiuted or unsubstituted) may be saturated or olefinically unsaturated and either aliphatic, aromatic or mixtures thereof. Non-active hydrogen atom containing functional groups include: ethers, esters, acetals, aromatically bonded halogens, tertiary amines, dialkyl amides, epoxides and nitriles.

The hydrosiloxanes that are useful in the present invention include those siloxanes that are composed essentially of groups having the repeating formula:

(B)   

where R is the same as defined above, $a$ has a value of 1 to 3 inclusive, $b$ has a value of 0 to 2 inclusive, and (a+b) has a value of 1 to 3 inclusive, all numbers being whole numbers.

Siloxanes that are useful in the present invention also include copolymers of units represented by Formula (B) above with units represented by Formula (C) below wherein the ratio of (B):(C) may be from 60:1 to 1:60. Formula (C) may be represented as:

(C)  $$R_cSiO_{\frac{4-c}{2}}$$

where R is defined as above and $c$ has a value of 0 to 3 inclusive.

Illustrative of unsubstituted saturated aliphatic hydrocarbons or alkyl groups represented by R in Formulas (A), (B) and (C) above are methyl, ethyl, propyl, butyl, octadecyl, cyclohexyl and cyclopentyl groups. Illustrative of unsaturated, aliphatic hydrocarbons or alkenyl groups are vinyl butenyl, cyclopentenyl and cyclohenenyl. Illustrative of saturated aryl groups are phenyl or naphthyl groups; illustrative of alkaryl groups are tolyl and xylyl; illustrative of aralkyl groups are benzyl and beta-phenylethyl. Illustrative of functionally substituted hydrocarbon groups which may be bonded to silicon atoms are dimethylaminoethyl, epoxyethyl, methoxymethyl and carbethoxy.

Preferred copolymers composed of units represented by Formulae B and C above may be represented by the formula:

(D)  $(R'_3SiO)(R'_2SiO)_x(R'HSiO)_y(SiR'_3)$ where R' represents any monovalent hydrocarbon group, for example, methyl, ethyl, propyl, cyclohexyl, phenyl, vinyl, tolyl or benzyl. Where more than one R' group is attached to any particular silicon atom they may be the same or different groups. Preferably R' is a saturated hydrocarbon group; the methyl group being the most preferred. The value of $x$ may have any average value of from 0 to about 60 and $y$ may have any average value of from 1 to about 60.

For example, if in Formula D $x=0$, $y=1$, and all R's are methyl, the siloxane, hereafter labeled Siloxane (I) is:

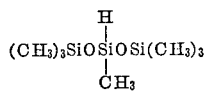

If in Formula D $x=21.5$, $y=3.5$ and all R's are methyl, the siloxane, hereafter labeled Siloxane (II) is:

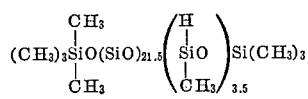

If in Formula D $x=0$, $y=3.5$ and all R's are methyl, siloxane, hereafter labeled Siloxane (III) is:

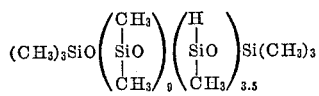

If in Formula D $x=0$, $y=40$ and all the R's are methyl, the siloxane, hereafter labeled Siloxane (IV) is:

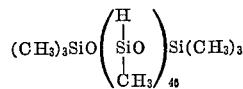

Illustrative of specific low molecular weight hydrosilicon compounds are: $SiH_4$, $(CH_3)_3SiH$, $\phi_2SiH_2$, $CH_3\phi SiH_2$, $CH_3C_2H_3SiH_2$, $(CH_3)_2SiH_2$, $\phi SiH_3$, $C_5H_{11}SiH_3$, $Cl_3SiH$, $Br_2SiH_2$, $(CH_3)_2HSiOSiH(CH_3)_2$, $SiH(OCH_3)_3$, $SiH(OC_2H_5)_2Cl$, $SiH_2Cl(OC_2H_5)$, $SiH_3Cl$, $Si_2H_6$, $SiH_3Br$, $SiH_3I$, $SiH_3F$, $SiH_2Cl_2$, $Si_3H_8$, $SiHCl_3$, $Si_4H_{10}$, $Si(O\phi)_3H$, $\phi_3SiSiH\phi_2$, $CH_3SiH_3$, $H_3SiCN$, $CH_3(CH_2=CHCH_2)_2SiH$, $H_3CCOO\phi C_3H_6SiH_2\phi$, $(C_6H_{11})_3SiH$.

As a catalyst in the isomerization or conjugation reaction any metallic compound may be used which promotes the addition of a hydrosilicon compound to an olefinically unsaturated compound. Such catalysts are well known in the art. In general, these catalysts include the stable Group VIII metals and their salts. These metals are platinum, ruthenium, rhodium, iridium, palladium, osmium, cobalt, nickel and iron. Platinum is the preferred metal. It may be used in various forms such as platinum on carbon, platinum on alumina, platinum black, platinic chloride, potassium chloroplatinate and the most preferred form, chloroplatinic acid.

Illustrative of the above salts which can be employed as catalysts are palladous acetate, formate and propionate, the alkali metal halo salts, e.g. potassium chloropalladate, sodium chloropalladate or platinate and the like.

The iron, nickel and cobalt salts are less active than the other Group VIII metals, consequently, those salts which are soluble in the reaction medium so as to provide a homogeneous reaction solution are preferred. Illustrative of these salts are the octoates, abietates, naphthenates, and linoleates.

In addition, the halides and oxides of platinum, ruthenium, iridium, rhodium, palladium and osmium are useful catalysts. Illustrative of such compounds are bromoplatinic acid, magnesium chloropalladate, trimethylplatinum iodide, trimethylplatinum chloride, palladous dichloride, rhodium chloride, ruthenium trichloride, palladous oxide, osmium monoxide, platinous monoxide and the like.

Still other useful catalysts are organic complexes of the above metals such as carbonyl complexes of the metal salts, and olefin or acetylene complexes of said metals. Exemplary are the complexes of platinum or palladium with ligands, one or more of which can be or have been displaced by an alkene, e.g. ethylene, propylene, butylene etc. to form a platinum-olefin complex or a palladium-olefin complex. For example, palladous acetylacetonate, palladous dibenzonitrile dichloride, ethylene platinous chloride, bis(cyclopentadienyl) osmium, cyclopentadienyl iridium, cyclopentadiene, cobalt pentacarbonyl and its hydride, iron carbonyls, nickel carbonyls and hydrides, ferrocenes, nickelocenes, cobaltocenes etc.

The above catalysts may be employed in a concentration of about 0.1 to 5000 p.p.m calculated as elemental metal based on the weight of the polyene; the preferred range being 0.1 to 10 p.p.m. To facilitate handling of the relatively small amounts of catalysts required, it is convenient to employ a solution of the catalyst in an organic solvent. Useful solvents include ethylene glycol di(lower alkyl) ethers, polyethylene glycol di(lower alkyl) ethers, polyethylene glycol di(lower alkyl) ethers, such as the methyl and ethyl ethers; isopropanol, dioxane and tetrahydrofurane.

It is preferable that the metal catalyst be soluble in the polyene or in an organic solvent which is miscible with the polyene to be isomerized, so that the reaction may be carried out in a homogeneous system. However, the invention is not restricted to homogeneous systems or oil-soluble catalysts. When catalysts which are insoluble in oil are used, such as platinum dioxide, the concentration of the catalyst will ordinarily have to be 10 to 100 times greater than when an oil-soluble catalyst is used. For example, when $H_2PtCl_6 \cdot 6H_2O$ in dimethoxy ethane or dioxane is used as the catalyst 0.1 to 10 p.p.m. platinum based on oil is sufficient, whereas 500 to 5000 p.p.m. of platinum is required when insoluble $PtO_2$ is used. Still greater amounts of catalysts are needed when nickel or cobalt compounds are used instead of platinum.

Reaction conditions may be varied. Although the preferred reaction temperature for isomerization of oils is 200–240° C., the operable range is from 150° C. to about 250° C. At 250° C. the reaction time is several minutes, at 200° C. about 50 minutes is ordinarily required. For practical purposes no conjugation takes place below about 150° C. At room temperature no conjugation was observed after 90 days. The reaction does not require pressure unless volatile solvents or reactants are used.

The reaction may be carried out with or without the presence of solvents. Solvents are preferred, however, since better molecular interaction is obtained, and since solvents appear to act as promoters for the isomerization reaction. Useful solvents include ethylene glycol or polyethylene glycol, dimethyl or diethyl ether, tetralin, dioxane, dioxolane, tetrahydrofurane, benzene and xylene.

It has additionally been discovered that when polymeric hydrosilicon compounds having a plurality of SiH groups are used in the isomerization reaction, as for example, Siloxane (IV), a reaction occurs between the conjugated polyene and any unreacted hydrosilicon compound which produces a fluffy solid material. This reaction consists of the addition of the hydrosilicon compound to the most reactive portion of the conjugated polyene in the ratio of about 2½ to 3 moles of conjugated polyene per mole of hydrosilicon compound. Conjugated trienes and tetraenes are more reactive than conjugated dienes and will therefore react preferentially in the formation of the solid precipitate. These addition compounds, which constitute about 1 to 3 percent of the oil, are fluffy precipitates having a particle diameter of about 40 to 80 microns and a refractive index of about 1.5120 to 1.5160. The precipitate can easily be separated from the oil by filtration. The precipitate is an effective U.V. absorber, transformer and reflector. It transforms actinic U.V. light into harmless visible light. Consequently, the precipitate can serve as the active U.V. absorber in skin ointment when applied in a base of petrolatum or lanolin.

It has also been found that the above described precipitate which forms during the conjugation reaction adsorbs the platinum or other catalyst on its surface. Thus, it has been found that where 1 p.p.m. platinum catalyst was used in the conjugation reaction the precipitate which formed contained up to 60 p.p.m. of the catalyst. This selective adsorption makes it possible to recover the expensive metal catalyst. By calcining the precipitate in air, a finely divided platinum-on-silica can be recovered. This material can be used as a hydrogenation catalyst, as an active carrier for other catalysts or as a raw material for the preparation of chloroplatinic acid.

When relatively large amounts of metal catalyst are used in the isomerization process, as is essential when cobalt or nickel are the catalysts, only a portion of these catalysts is adsorbed on the solid precipitate. Another portion remains coordinated or chelated with the conjugated oil. This chelated metal is an extremely active catalyst. An oil containing a few tenths of one percent of such a coordinated nickel or cobalt catalyst can be hydrogenated by bubbling hydrogen gas through the solution at 60 to 90° C. at atmospheric pressure.

In ordinary drying oils, as well as in heat bodied or so-called stand oils, drier metals (Pb, Co and Mn) have a tendency to precipitate as relatively oil-insoluble soaps. This causes turbidity which detracts from the general appearance and commercial value of the oil. In addition, such soaps are often selectively adsorbed onto pigments having an active surface such as carbon black. Such absorption of the drier metals to pigment has the effect of removing the driers from the oil, causing the loss of drying properties. In order to overcome this difficulty, chelating agents have in the past been added to oils to keep the driers in solution. It has been discovered that the conjugated oils of this invention are chelators and solubilizers for driers as well as for metallic catalysts. Conventional drying oils containing drying metals are often dark brown in color and sometimes contain precipitation, whereas the oils produced by this invention are much lighter, being only slightly pink-purple and contain no precipitated drying metals. Additionally, the drying power of the metals is markedly increased by chelation so that shorter drying times are achieved with the oils produced by this invention than with conventional drying oils. Alternatively, conventional drying times may be achieved with the use of less driers. Since drier catalysts are also responsible for further oxidation, i.e. degradation of the solid film, a reduction in drier content will result in an increased outdoor life for the oil films.

Table I below compares the properties of linseed oil which has been conjugated by the methods of this invention with conventional alkali refined linseed oil and with tung oil. The results clearly demonstrate that conventional linseed oil may be upgraded by conjugation of its double bonds according to this invention to have properties very similar to, and in some respects superior to, that of tung oil.

TABLE I

| Property | Isomerized Linseed Oil | Alkali Refined Linseed Oil | Tung Oil |
| --- | --- | --- | --- |
| Viscosity, 25° C. | 150–300 cp. | 45–50 cp. | 200–400 cp. |
| Percent of double bonds which are conjugated. | About 45% | Up to 8% | About 80%. |
| Refractive Index | 1.4900–1.4910 | 1.4797 | 1.5163–1.5175. |
| Drying time in the presence of driers | 15–20 minutes | 4–6 hours | 30 minutes. |
| Gelation time at 308° C. | 20–30 minutes | | 5–8 minutes. |
| Color (Gardner-Hellige) | 2 | 4 | 5–6. |
| Oxygen absorption in the presence of driers, percent. | 6–8 | 14–18 | 10. |
| Water absorption in 144 hours | 10–16% | 165% | 10–16%. |
| Destruction of dry film in 0.1% NaOH | 90 minutes | 1 minute | 16 hours. |
| Salt spray test on steel panels | 1% rust | 90% rust | (¹). |
| Blistering Test | Does not blister | Blisters | (¹). |
| Chelating of drier metals | Chelates | Does not chelate | Does not chelate. |
| Time required for the preparation of a stand oil (~70 poises) at 250° C. | 2–3 hours | 40–60 hours | 2–3 hours. |
| Ice blooming ² | Yes | No | Yes. |

¹ No coherent film could be obtained from pure tung oil.
² "Ice Blooming" or "frosting" is a wrinkled pattern which appears in a film of oil subjected to a gas chamber test. For details of the test see "Physical and Chemical Examination of Paints, Varnishes, Lacquers & Colors" by Gardner and Sward, 11th edition (1950), p. 513. Such a pattern is characteristic of oils containing conjugated double bonds, viz. drying oils such as tung oil, dehydrated castor oil, and oiticica oils, and the conjugated oils of this invention. It is not formed by linseed oil or semi-drying oils.

Throughout the examples to follow, unless otherwise specified, the catalyst used is a solution of $H_2PtCl_6$. This catalyst solution is made up by dissolving 7.55 grams of commercial chloroplatinic acid, $H_2PtCl_6 \cdot 6H_2O$ in 3.00 grams of 95% ethanol and 192.50 grams of ethylene glycol dimethylether. One drop of this solution contains about 0.00025 gram of platinum.

Wherever linseed or other oils are mentioned throughout the following examples, unless otherwise specified, the oil has been alkali refined by conventional methods such as described in "Surface Coatings" by H. W. Chatfield, D. Van Nostrand Co. (1962) pages 30–31.

Throughout the examples to follow wherever "driers" are set forth, a mixture of the following composition was used: 0.3% lead, 0.03% cobalt and 0.015% manganese in the form of naphthenates or octoates. The percentage is calculated as the weight of metal and based on the weight of the oil.

All viscosity measurements given in the examples were measured at 25° C. unless otherwise specified, and all percentages are based on weight unless specified otherwise.

In order to more fully describe the invention the following examples are given by way of illustration only and are not intended to limit the scope of the invention.

EXAMPLE I 100 g. linseed oil was mixed with
60 g. of Siloxane III. To this was added:
1 drop $H_2PtCl_6$ catalyst solution prepared as described above.

The mixture formed an emulsion of the siloxane in oil at room temperature. It was heated rapidly to 200° C. At about 195° C. the mixture became clear. The reaction, which is exothermic, raised the temperature to 210° C. After reaching 210° C. the mixture was cooled to room temperature. A clear oil was obtained; it had a viscosity of 300 cp., and dried with driers in 40 minutes. The isomerized oil is soluble in aromatic solvents, mineral spirts, linseed oil, varnishes, in n-butyl alcohol and in mineral oils; it is insoluble in methanol and silicone oils. Ordinary linseed has no more than about 8% of its double bonds conjugated. The isomerized oil, as evidenced by ultraviolet and infrared spectroscopy has about 50% of its double bonds conjugated, contains 14.4% silicon, and 18.7 ml. of silanic hydrogen per gram of oil. The latter figure indicates that a considerable proportion of unreacted SiH groups remain in the oil.

EXAMPLE II

Example I was repeated on larger scale with less catalyst. A mixture of the following was prepared.

1000 g. linseed oil
600 g. Siloxane III, and
5 drops $H_2PtCl_6$ catalyst solution The above mixture was heated to 190° C. and then cooled immediately. The refractive index of the mixture increased from an initial value of 1.4490 to 1.4583 which is indicative of the fact that at least 60% of the double bonds became conjugated. The viscosity increased from 45 to 264 cp. The color value of the oil diminished from 5 to 2.5. The oil dried at room temperature with the above described driers in 15 minutes.

The treated oil contained a small amount of free hydrosilicon compound which acts as a polymerization catalyst, thus it enables the oil to copolymerize with any other compound containing ethylenic or acetylenic unsaturation, for example, linseed oil, tung oil, rosin, estergum, esterified condensation products of rosin with phenol-formaldehyde addition products, styrene, acrylonitrile, methylacrylate, butadiene, cyclopentadiene, maleic acid anhydride, its esters and polyesters etc. The presence of the free hydrosilicon compound also shows that the addition reaction is subordinated to the conjugation reaction.

The oxygen absorption of this oil was observed and compared to that of untreated linseed oil, using the same amount of drier in each case. The results are tabulated below and show the percent weight changes in the films due to oxygen absorption as a function of time.

TABLE II.—OXYGEN ABSORPTION OF LINSEED OIL AND THE OIL OF EXAMPLE 2 AT ROOM TEMPERATURE

| Hours | 1 | 2 | 3 | 4 | 20 | 44 | 116 | 792 |
|---|---|---|---|---|---|---|---|---|
| Linseed | 3.5 | 10 | 9.4 | 9 | 7 | 7.6 | 6.3 | 6.3 |
| Example 2 | 0.7 | 4 | 3.7 | 3.7 | 3.1 | 4.7 | 5.4 | 3.8 |

Table II shows that the conjugated oil of Example 2 undergoes much smaller weight changes (gains and losses) than untreated linseed oil under the same conditions. Linseed oil in this test gained almost 10% by weight due to oxygen absorption, and then lost about 40% of the gain by formation of volatile oxidative decomposition products, whereas the conjugated oil absorbed only about 4% oxygen and this amount remained practically constant, demonstrating that the isomerized oil requires considerably less oxygen to form a dry film than conventional linseed oil and that the isomerized oil is far less subject to oxidative degradation. It is important to note that the density of such films changes as a result of oxygen absorption and decomposition. These changes in density are accompanied by changes in volume, each in turn causes stresses to develop in the film. The stresses eventually result in cracking. It is evident, therefore, that a film which absorbs less oxygen during the drying process is less prone to both chemical and mechanical decay than the film which absorbs greater quantities of oxygen.

EXAMPLE III 200 g. of the conjugated oil of Example II was copolymerized with 600 g. tung oil (refractive index 1.5150, viscosity 350 cp., color value 7) by heating the mixture of the oils to 260° C. in 10 minutes and then cooling it for 20 minutes. A clear oil was obtained. A film of this oil laid down on a glass plate dried at room temperature and in the presence of driers in about 15 minutes, and was dry throughout in 25 minutes. The color value of the copolymerized tung oil was 5, its refractive index 1.5021, and its viscosity 520 cp.

Table III below shows weight changes in films laid down on test plaques coated with the copolymerized conjugated oil of Example III as compared with films coated with a conventional linseed oil varnish composition used in many commercial paints and varnished, labeled Varnish A.

Varnish A was prepared by mixing together:

200 g. stand oil (viscosity 7,850 cp.),
300 g. alkali refined linseed oil,
2.5 g. cobalt naphthenate
0.823 g. manganese naphthenate, and
2.080 g. lead naphthenate The above ingredients were heated to 180° C., then allowed to cool to room temperature. The stand oil was prepared by heating alkali refined linseed oil at 300° C. in a $CO_2$ atmosphere for 6 hours.

TABLE III.—PERCENT WEIGHT INCREASE IN HOURS

| Hours | 1 | 2 | 24 | 48 | 120 | 288 |
|---|---|---|---|---|---|---|
| Oil (percent): | | | | | | |
| Varnish A | 3.8 | 11.5 | 17 | 17 | 15 | 16.9 |
| Example 3 | 3 | 6 | 5 | 3.4 | 3 | 3.4 |

Large fluctuations of weight are observed in the films made from Varnish A; however, the films made of the conjugated copolymer oil remained fairly constant. This demonstrates that films prepared from the conjugated oils of this invention absorb less oxygen during the drying process and subsequently form less volatile decomposition products than prior art varnishes.

In order to compare the properties of the conjugated oils with conventionally treated oils still further, three spar varnishes were prepared in the manner described below.

Resin solution B

A resin solution labeled Resin Solution B was prepared by mixing together the following ingredients:

|  | G. |
|---|---|
| Oil soluble p-tertiary-butyl phenol formaldehyde resin | 80 |
| i-Propyl alcohol | 12 |
| Naphtha | 108 |
|  | 200 |

Spar varnish No. 1

A spar varnish was prepared by mixing together the following:

| | G. |
|---|---|
| Resin solution B | 50 |
| Tung oil | 29.4 |
| Commercial heat bodied linseed oil (7850 cp.) | 10 |
| Mineral spirits | 15 |
| Drier | 1.6 |
| | 106.0 |

Spar varnish No. 2

A spar varnish was prepared by mixing together the following:

| | G. |
|---|---|
| Resin solution B | 50 |
| Tung oil | 29.4 |
| Conjugated oil of Example II | 10 |
| Mineral spirits | 15 |
| Drier | 1.6 |
| | 106.0 |

Spar varnish No. 3

A spar varnish was prepared by mixing together the following:

| | G. |
|---|---|
| Resin solution B | 50 |
| Conjugated oil of Example III | 40 |
| Mineral spirits | 15 |
| Drier | 1.6 |
| | 106.6 |

Spar varnish No. 1 is a blank containing no conjugated oil prepared according to this invention. Spar varnish No. 2 and spar varnish No. 3 contain conjugated oils. Spar varnish No. 3 contains the same amount of tung oil as varnish No. 1 and varnish No. 2, but in No. 3 the tung oil has been copolymerized according to Example III with the conjugated linseed oil of Example II.

All three varnishes dried to a hard film in three to four hours. Two coats of each of the three varnishes were painted on both sides of fir plywood panels. After drying for one week the panels were weighed and then exposed in an "Atlas Twin Arc Weatherometer." The test consists of exposing the samples at 65° C. to the radiation of two carbon arc lamps and intermittent water spray. The percent increase in weight with time was observed. The results are given in Table IV below. The increase in weight is equal to the water absorbed by the wood through the layers of varnish. A 600 hour exposure in this weatherometer is equivalent to an outdoor exposure of about two years. The data in Table IV demonstrates the superiority of spar varnishes made with conjugated oils of this invention (No. 2 and No. 3) over a conventional spar varnish formulation (No. 1). The ability of conjugated oils to impart water impermeability for outdoor coatings is an obviosuly desirable characteristic.

TABLE IV.—WEATHEROMETER TEST

| Hours | 89 | 149 | 224 | 355 | 480 | 600 |
|---|---|---|---|---|---|---|
| Varnish: | | | | | | |
| No. 1 | 9.9 | 13.0 | 16.4 | 19.0 | 16.6 | 15.0 |
| No. 2 | 4.4 | 7.0 | 6.1 | 6.7 | 13 | 9.8 |
| No. 3 | 0.5 | 0.0 | 0.0 | 0.3 | 2.3 | 1.4 |

EXAMPLE IV 800 g. linseed oil
200 g. Siloxane I, and
5 drops of $H_2PtCl_6$ catalyst solution The above ingredients were mixed together and then heated for 1½ hours at 165° C. The oil produced had a pronounced green fluorescence and the following properties:

| | |
|---|---|
| Drying time | 35 minutes. |
| Silicon content | 7.5%. |
| Diene number | 15.2. |
| Silanic hydrogen | 12.0 ml./gm. |
| U.V. absorption | 233 mµ:27.41. 273 mµ:9.88. |

The U.V. absorption indicates that about 47% of the double bonds have become conjugated.

EXAMPLE V 300 g. heat-bodied linseed oil (viscosity 170 cp., refractive index 1.4827)
20.5 g. Siloxane IV
2 drops $H_2PtCl_6$ catalyst solution The above ingredients were mixed together and then heated for 3½ hours at 120° C., the temperature was then raised to 250° C. and heating continued for two additional hours after which the mixture was cooled and filtered. The resulting oil had a vascosity of 4000 cp., and a refractive index of 1.4869.

Example V shows that polymerized (heat-bodied) oils can be isomerized as well as monomeric oils, and that heavily bodied stand oils (4000 cp.) can be prepared at relatively low temperatures in a short time. The oil of Example V dried in 11 minutes. This is very rapid when compared to the drying time of conventional stand oil which requires at least 6 hours to dry.

EXAMPLE VI 300 g. linseed oil (refractive index 1.4791)
3 g. Siloxane IV
2 drops $H_2PtCl_6$ catalyst solution The above ingredients were mixed together and then heated at 240° C. for one hour, then filtered. The oil was then heated for an additional one, two and 3½ hours at 240° C., a sample being taken after each time interval. These samples were labeled A, B, C and D respectively. The characteristics of the oils obtained are given in Table V below.

TABLE V

| Sample | Heating Time at 240° C., Hours | Viscosity, cp. | Refractive Index | Drying Time (with Drier), minutes |
|---|---|---|---|---|
| A | 1 | 226 | 1.4878 | 25 |
| B | 2 | 400 | 1.4878 | 30 |
| C | 3 | 600 | 1.4880 | 35 |
| D | 4½ | 1,750 | 1.4883 | 35 |

Conventional heat-bodied linseed oil having a viscosity of 1750 cp. (the same as sample D) would dry in about 6 to 12 hours. Table V demonstrates that with increasing polymerization, part of the unsaturaion is lost as evidenced by an increase in drying time. The same phenomenon is apparent from the U.V. spectrum shown in Table VI below. The results of Example VI demonstrate, additionally, that as little as 1% siloxane based on the weight of the oil promotes polymerization as well as conjugation. To reach a viscosity of 1750 cp., pure linseed oil would have to be heated at 280° C. to 300° C. for at least 4–6 hours. Such heating would cause a loss of 2–6% as volatiles, whereas at 240° C. practically no volatile substances are formed. The method of this invention therefore results in a marked economy in fuel, processing time and yield in the production of high viscosity drying oils.

TABLE VI

| Oil | Absorption at— | |
|---|---|---|
| | 233 mµ | 273 mµ |
| A | 26.4 | 12.4 |
| D | 17.8 | 3.4 |
| Heat-bodied linseed oil | 5.1 | 0.34 |

EXAMPLE VII 20 g. methyl linoleate (refractive index 1.4594)
0.6 g. Siloxane IV
1 drop $H_2PtCl_6$ catalyst solution The above ingredients were mixed together and then heated slowly to 180° C. and then held at that temperature for 30 minutes. The isomerized ester produced had a refractive index of 1.4662, a silicon content of 0.8%, and 1.0 ml./gm.g. silanic hydrogen. Infrared spectrum analysis showed that about 40% of the original cis configuration was converted to the trans configuration, and showed that 60% of the double bonds had become conjugated. With longer heating or higher temperature, a higher conversion may be achieved. This example demonstrates that even at relatively low temperature conditions relatively high degrees of isomerization may be achieved.

EXAMPLE VIII 20 g. methyl linoleate
1.1 g. Siloxane IV
1 drop $H_2PtCl_6$ catalyst solution The above ingredients were mixed together at room temperature, then heated in a nitrogen atmosphere to 180° C., and then heated to 240° C. and kept there for 30 minutes. Samples were taken of the mixture before heating, when the reaction mixture reached 180° C., and after 30 minutes of heating at 240° C. The U.V. spectrum and refractive index of the above samples is given in Table VII below.

TABLE VII

| Example VIII | Absorption at— | | Refractive Index | Percent Double Bonds Conjugated |
|---|---|---|---|---|
| | 233 mμ | 270 mμ | | |
| Unreacted mixture | 2.7 | 0.43 | 1.4693 | 0.02 |
| After heated to 180° C | 21 | 3.9 | 1.4720 | 18.0 |
| After 30 minutes at 240° C | 27 | 25 | 1.4862 | 34.0 |

The U.V. spectra in Table VII demonstrates that the triply unsaturated linolenic acid ester is relatively easily rearranged to an ester with two conjugated and one isolated double bond, whereas isomerization to a conjugated triene occurs only more slowly and at a higher temperature.

EXAMPLE IX 300 g. linseed oil (refractive index 1.4791)
3 drops $H_2PtCl_6$ catalyst solution
6 g. Siloxane IV dissolved in
12 g. xylene The above ingredients were mixed together and then heated for 30 minutes at 240° C. under nitrogen. Thereafter, the xylene was evaporated under vacuum. The oil after cooling and filtration had a viscosity of 200 cp., a refractive index of 1.4901, contained 0.4% silicon, 0.5 ml./gm. silanic hydrogen, and dried in 20 minutes with wriers. The large increase in refractive index after only 30 minutes of heating demonstrates the increased effectiveness of the siloxane when dissolved in a solvent. In this example 55% of the double bonds became conjugated as evidenced by ultraviolet and infrared spectroscopy and by the increase of the refractive index.

EXAMPLE X 300 g. refined soybean oil
3 drops $H_2PtCl_6$ catalyst solution
6 g. Siloxane IV
12 g. xylene The above ingredients were mixed together and then heated for 30 minutes at 240° C. Thereafter, the mixture was cooled and filtered; 7 g. of a solid precipitate was recovered.

The soybean oil had a viscosity of 58 cp. and a refractive index of 1.4729 prior to the reaction. After reaction, the oil had a viscosity of 140 cp., a refractive index of 1.4787, and a pandiene number of 29.4.

The unreacted oil dried with driers in 8–12 hours, the conjugated oil of this example dried under the same conditions in less than 2 hours, hence, in a faster time than that required for ordinary linseed oil. In this example, 56% of the double bonds of the oil became conjugated as evidenced by the pandiene number. The isomerized oil had a silicon content of 0.7% while the solid precipitate contained 12.5% silicon.

EXAMPLE XI 300 g. safflower oil (viscosity 44 cp.; refractive index 1.4745)
6 g. Siloxane IV dissolved in
12 g. xylene
3 drops $H_2PtCl_6$ catalyst solution The above ingredients were mixed together, heated for 30 minutes at 240° C., cooled and filtered. 6.2 g. of a solid precipitate was recovered. The oil had a viscosity of 176 cp., refractive index of 1.4817, contained 0.7% silicon, and 0.5 ml./gm. silanic hydrogen. The oil dries with drier in 90–100 minutes. Ice blooming and chelation tests were positive. In this example, 63% of the double bonds of the oil became conjugated as evidenced by ultraviolet spectroscopy.

EXAMPLE XII 300 g. linseed oil
1.5 g. cobalt naphthenate,
12 g. Siloxane IV dissolved in
24 g. xylene The above ingredients were mixed together and then heated at 240° C. for 75 minutes. Upon filtration 5.9 g. of a black, spongy mass was separated from a dark oil, having a viscosity of 230 cp., refractive index of 1.4847. Drying time of the oil (with driers) was 35–40 minutes. This example demonstrates that while cobalt is also an isomerization catalyst, it is not as effective as platinum. Very finely cobalt remains in the oil producing a dark color. This finely divided cobalt can be used as catalyst in a homogeneous system. In this example about 18% of the double bonds in the oil became conjugated as evidenced by refractive index measurements.

EXAMPLE XIII 300 g. safflower oil
12 g. Siloxane IV dissolved in
24 g. xylene
3 drops $H_2PtCl_6$ The above ingredients were mixed together, heated at 240° C. for 30 minutes, xylene driven off, cooled and filtered. The oil produced had a viscosity of 460 cp., pandiene number of 47, refractive index of 1.4815, silicon content of about 1.3%, 1 ml./gm. silanic hydrogen, and dried with driers in 60 minutes. Ice blooming and chelating tests were positive. In this example, 85% of the double bonds in the oil became conjugated as evidenced by the pandiene number.

EXAMPLE XIV

A mixture of the following was prepared:

197 g. linseed oil
15 g. Siloxane I
4 drops $H_2PtCl_6$ catalyst solution

Siloxane I is oil-soluble. The mixture was heated to reflux at 180° C. Reflux stopped after 5 minutes when the siloxane was used up in the reaction. The temperature was then raised to 240° C. and maintained for 60 minutes. The cooled oil was clear, had a viscosity of 900 cp., refractive index of 1.4869, silicon content of about 2.7%, and dried with driers in 40 minutes. A sample of the above oil taken after the first 30 minutes of heating at 240° C. had a refractive index of 1.4866 and dried in 15 minutes. The unappreciable change in refractive index after the succeeding 30 minutes and the increased drying time indicate that additional 30 minutes of heating caused polymerization rather than further conjugation. In this example, about 25% of the double bonds in the oil became conjugated as evidenced by refractive index measurements.

EXAMPLE XV

A mixture of the following was prepared:

300 g. linseed oil (index of refraction 1.4790)
11.6 g. $C_5H_{11}SiH_3$
6 drops $H_2PtCl_6$ catalyst solution Amylsilane is soluble in oil, therefore, no solvent is required. The mixture was heated for 1½ hours at 240° C. and cooled, no precipitation formed. The resulting oil had a viscosity of 420 cp., refractive index of 1.4880, silicon content of 1.0%, and a drying time (driers added) of 25 minutes. Ice blooming and chelating tests were positive. In this example, about 40% of the double bonds of the oil became conjugated as evidenced by refractive index measurements.

EXAMPLE XVI 197 g. linseed oil
15 g. $(CH_3)_2HSiOSiH(CH_3)_2$
4 drops $H_2PtCl_6$ catalyst solution A mixture of the above ingredients was prepared and heated to reflux at 180° C. The reflux remained for about 5 minutes. The temperature was then raised to 240° C. and maintained for 60 minutes. A clear oil resulted having a refractive index of 1.4869, viscosity of 900 cp., silicon content of 3.0%, 4.5 ml./gm. silanic hydrogen, a 40 minute drying time, and showed positive ice blooming and chelating. In this example, about 37% of the double bonds became conjugated as evidenced by refractive index measurements.

EXAMPLE XVII 300 g. linseed oil
40.5 g. Siloxane IV
1 drop $H_2PtCl_6$ catalyst solution After the $H_2PtCl_6$ was added to the oil, Siloxane IV was added dropwise at 70° C. over a period of 2 hours. The mixture was then heated at 100° C. for an additional 2 hours. To 300 g. of this mixture 600 g. linseed oil was added. The entire mixture was then heated at 240° C. for 2 hours and filtered. The product was 30 g. of a greenish-white fluffy powder and a clear oil. The oil had a drying time of 8 minutes, viscosity of 670 cp., silicon content of 1.5%, 3.5 ml./gm. silanic hydrogen content, and a refractive index of 1.4882. Chelating and ice blooming tests were positive. The U.V. absorption of the oil was 27.96 at 233 mμ and 13.25 at 273 mμ indicating that 46% of the double bonds had become conjugated. The powder obtained by fitration consisted of a talc-like solid having a refractive index of 1.5120–1.5160 and contained 12.5% silicon. This high index of refraction is indicative of the presence of conjugated trienes or tetraenes.

Isomerized oils of this invention may be utilized as a substitute for tung oil, and in numerous coating compositions, for example, in indoor as well as outdoor paints for wood and metal substrata, spar varnishes, alkyd varnishes, anti-rust primers, enamels and printing inks. They may also be used as rubber extenders, in linoleum, in oil cloth and for wood impregnation.

What is claimed is:

1. A process for isomerizing at least 10 percent of the aliphatic carbon-to-carbon double bonds of a polyene containing up to 24 carbon atoms which comprises reacting at a temperature of about 150 to 250° C.

(1) a non-conjugated polyene containing a chain of at least five carbon atoms, and at least two aliphatic carbon-to-carbon double bonds, wherein each successive pair of carbon atoms joined by said double bonds is separated from another pair by from one to about six carbon atoms, with (2) a hydrosilicon compound containing at least one hydrogen atom bonded directly to a silicon atom said hydrosilicon compound being selected from the group consisting of hydrosilanes and hydrosiloxanes, wherein said hydrosilicon compound is used in such amount that the ratio of SiH groups to double bonds will be from 1:5 to 1:85, and (3) a metal containing SiH addition catalyst selected from the group consisting of platinum, ruthenium, rhodium, iridium, palladium, osmium, cobalt, nickel iron and salts thereof.

2. The process of claim 1 wherein said hydrosilanes are represented by the formula $R_xSiH_{4-x}$ where R is selected from the group consisting of (a) an unsubstituted hydrocarbon group, (b) a functionally substituted hydrocarbon group wherein the functional group is a non-active hydrogen atom containing functional group, and (c) a non-active hydrogen atom containing functional group, and where $x$ has a value of 0 to 3 inclusive.

3. The process of claim 1 wherein said hydrosiloxanes are selected from the group consisting of (A) compounds composed essentially of groups having the repeating unit:

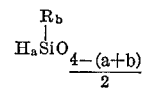

where R is selected from the group consisting of (a) an unsubstituted hydrocarbon group, (b) a functionally substituted hydrocarbon group wherein the functional group is a non-active hydrogen atom containing functional group, and (c) a non-active hydrogen atom containing functional group, where $a$ has a value of 1 to 3 inclusive, $b$ has a value of 0 to 2 inclusive and $(a+b)$ has a value of 1 to 3 inclusive, and (B) copolymers of said repeating unit with units having the formula:

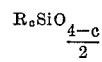

where R is defined above, and $c$ has a value of 0 to 3 inclusive.

4. The process of claim 3 wherein the hydrosiloxane compound is represented by the structural formula:

$$(R'_3SiO)(R'_2SiO)_x(R'HSiO)_y(SiR'_3)$$

where R' is a monovalent hydrocarbon group, the value of $x$ is from 0 to about 60 and the value of $y$ is from 1 to about 60.

5. The process of claim 1 wherein the hydrosilicon compound is $(CH_3)_3SiOSiHCH_3OSi(CH_3)_3$.

6. The process of claim 1 wherein the hydrosilicon compound is

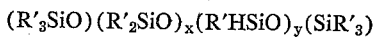

7. The process of claim 1 wherein the hydrosilicon compound is

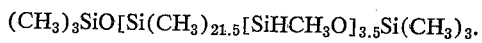

8. The process of claim 1 wherein the hydrosilicon compound is 

References Cited

UNITED STATES PATENTS 2,823,218   2/1958   Speier et al. _____ 260—448.2

ALEX MAZEL, *Primary Examiner.*

R. J. GALLAGHER, *Assistant Examiner.*

U.S. Cl. X.R.

260—91.7, 94.2, 397, 397.3, 397.5, 448.2, 448.8, 587, 631.5, 666, 680, 683.65